United States Patent [19]

Mitchell

[11] 4,243,153
[45] Jan. 6, 1981

[54] BOWL AND LID DISPENSER

[76] Inventor: Phillip E. Mitchell, 8511 Brookside Dr. West, Pewee Valley, Ky. 40056

[21] Appl. No.: 29,332

[22] Filed: Apr. 12, 1979

[51] Int. Cl.³ .............................................. B65H 1/00
[52] U.S. Cl. ........................................ 221/34; 221/45; 221/59; 221/63; 221/279; 312/43; 312/71
[58] Field of Search ................. 221/279, 280, 251, 34, 221/36, 56, 57, 59, 63; 312/43, 61, 71

[56] References Cited
U.S. PATENT DOCUMENTS

| 2,729,528 | 1/1956 | Bennett | 221/63 |
| 3,066,825 | 12/1962 | Saxe | 221/59 |
| 3,203,587 | 8/1965 | Mount et al. | 221/279 X |

*Primary Examiner*—Allen N. Knowles
*Attorney, Agent, or Firm*—Maurice L. Miller, Jr.

[57] ABSTRACT

A dispenser assembly for disposable plastic bowls is disclosed which includes a rectangular housing, open at the top, and a housing cover disposed thereover and defining a circular opening in the top. A slotted, flat, rectangular article supporting plate rides along raised, elongated and vertically extending rails formed on opposite inside walls of the housing which project into the slots. A coiled spring disposed in the housing supports the plate and extends around a raised circular wall formed on the bottom of the plate. A series of three elongated elements or nibs project downwardly from a ceiling of the housing cover around the circular opening and project inwardly of the opening a slight distance sufficient to interfere with and catch against the rolled rims of bowls stacked on the plate and projecting upward through the opening in the housing cover. A companion lid dispenser can be incorporated into the housing for convenience and efficient utilization of space.

8 Claims, 6 Drawing Figures

BOWL AND LID DISPENSER

BACKGROUND OF THE INVENTION

This invention relates generally to assemblies for dispensing cups, bowls and lids from a container.

Such devices, generally speaking, have been known to and used in the prior art. For example, see the lid dispenser disclosed in U.S. Pat. No. 3,861,563 issued to Arthur Lisbin, et al. on Jan. 21, 1975. The lid dispenser thus disclosed includes a cylindrical container in which a circular article supporting plate is disposed. A coiled spring is confined in compression between two disc elements fixed to opposite ends of a chain which limits the maximum permissible separation of the discs and, hence, the maximum distance of the plate above the floor of the container. A generally semi-circular lid cover is attached to the otherwise open end of the container, which lid cover defines a sloping ceiling which causes the top lid in a stack of lids supported by the plate to tilt upward from the stack toward the opening in the lid cover for easy removal of the top lid from the stack by hand. Other spring-loaded article dispensing assemblies known to the prior art include the bottle dispenser disclosed in U.S. Pat. No. 3,625,397 issued to George R. Shelly, et al. on Dec. 7, 1971, the bobbin dispenser disclosed in U.S. Pat. No. 2,879,122 issued to W. F. Maves on Mar. 24, 1959, the article dispenser disclosed in U.S. Pat. No. 3,291,544 issued to W. A. Ord on Dec. 13, 1966, and the cup dispenser disclosed in U.S. Pat. No. 2,729,528 issued to H. L. Bennett on Jan. 3, 1956.

None of these article dispensers discloses a bowl dispenser. The Bennett dispenser does disclose a dispenser having the capacity to releasably interfere with and confine cone-shaped cups having a rolled rim similar to the disposable bowls presently popular in delicatessens and the fast food industry. However, the latch mechanism involved is complex and utilizes moving parts.

These and other deficiencies of prior art article dispensers are substantially overcome by means of my invention.

SUMMARY OF THE INVENTION

It is an object of the present invention to provide an assembly for dispensing plastic bowls.

It is another object of the present invention to provide a combination bowl and lid dispenser in a housing making efficient use of space.

Briefly, in accordance with the principles and objects of my invention, there is provided a bowl dispenser which includes a housing, open at one end, and a spring coil disposed in the housing. An article supporting plate rests on the coil. A plurality of raised, elongated ribs are formed on and extend along inside walls of the housing. The plate defines slots therein which open toward the walls. The ribs project into the slots to form rails along which the plate can be raised and lowered. A housing cover is disposed over the open end of the housing and defines a circular opening over the plate through which a stack of bowls supported by the plate may extend. Lastly, at least three elongated nibs project downwardly from a ceiling of the housing cover around the opening in the cover and project inwardly of the opening sufficiently to interfere with the rim around the top of bowls stacked on the plate to confine the bowls and maintain the coil in compression against the plate.

These and other objects of my invention will become apparent to those skilled in the art from the following detailed description and attached drawings upon which, by way of example, only the preferred embodiment of my invention is illustrated.

DESCRIPTION OF THE PREFERRED EMBODIMENT

Figure 1:
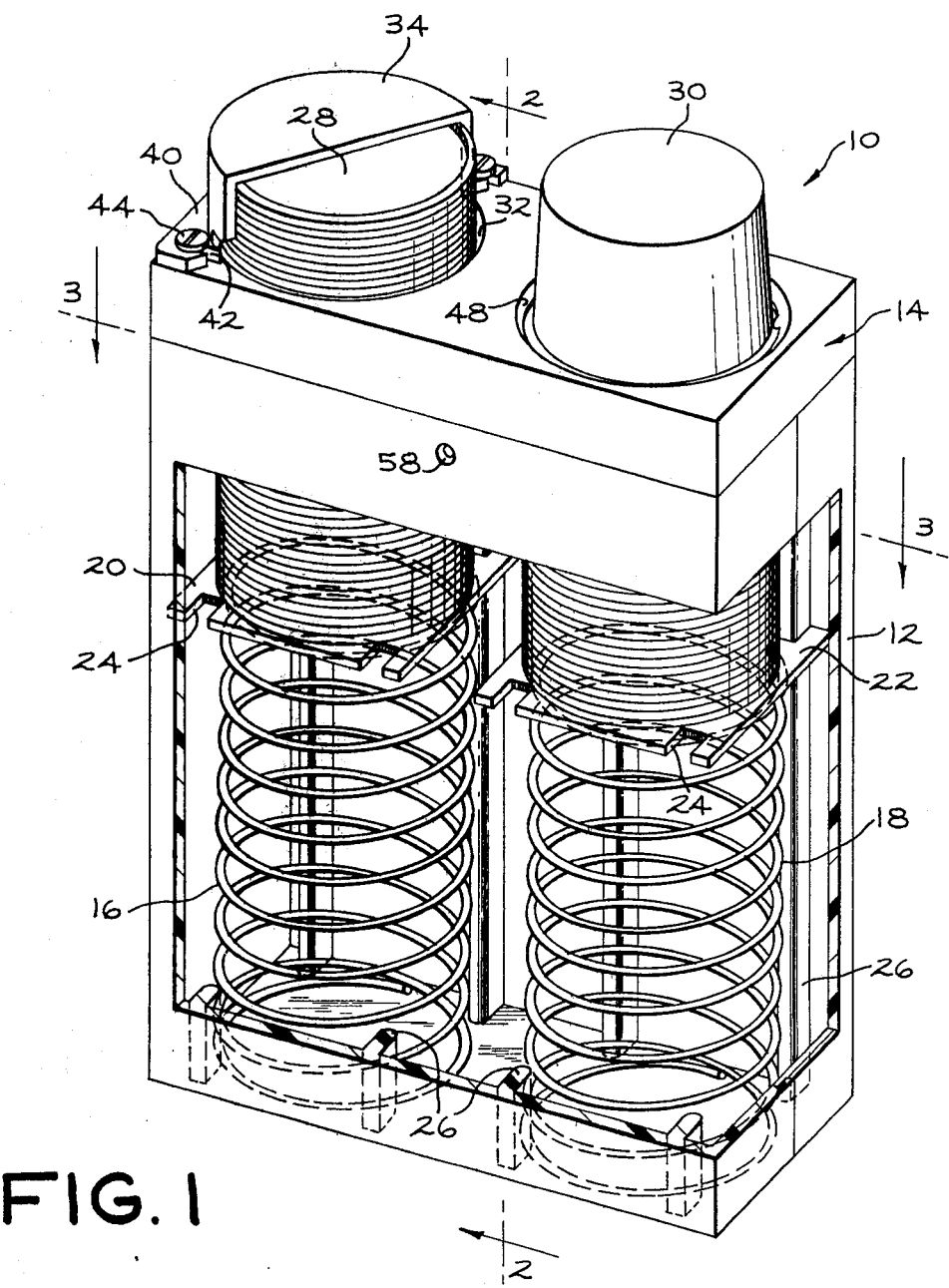
FIG. 1 shows an oblique projection of a bowl and lid dispensing assembly, thus illustrating one preferred embodiment of my invention.

Referring now to the drawings, there is shown, in one preferred embodiment of my invention, a cup and lid dispenser 10 having a housing 12 of rectangular cross-section and a cover 14.

Figure 5:
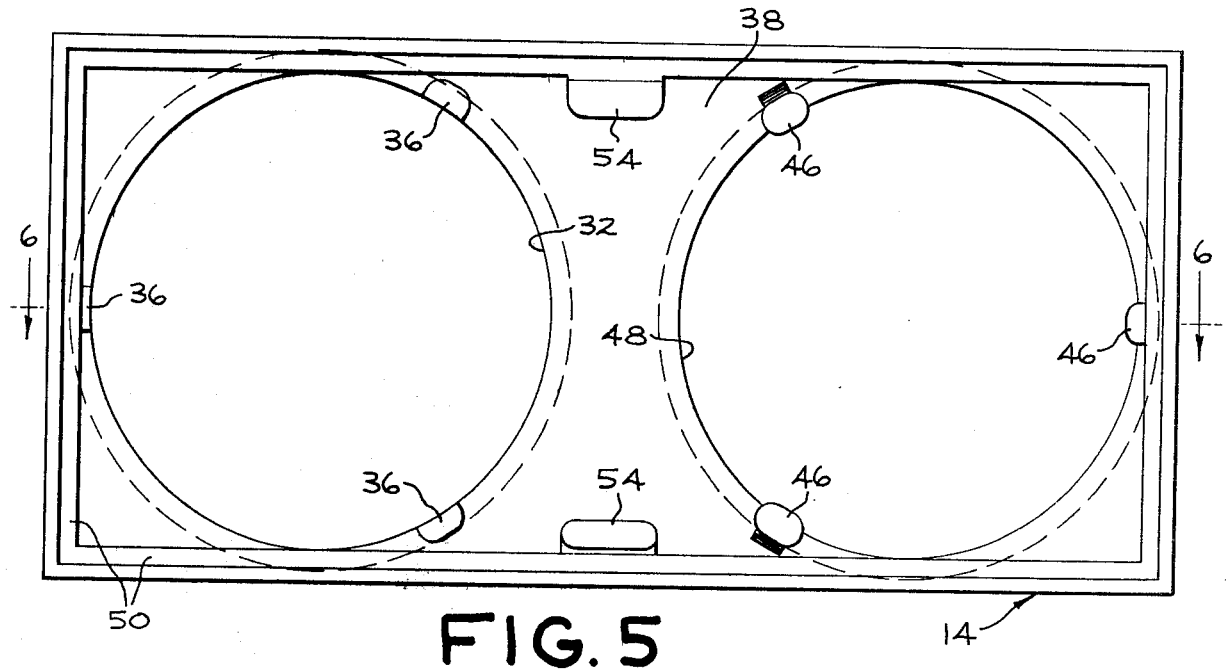
FIG. 5 shows a bottom plan view of a housing cover as used in the assembly of FIG. 1.
Figure 6:
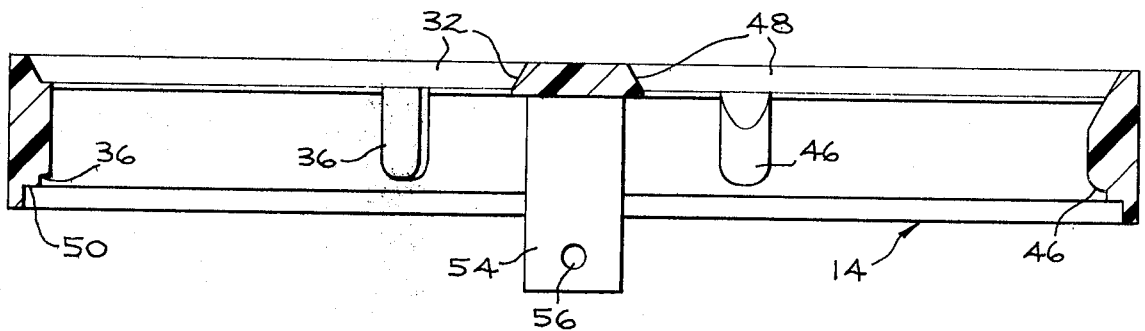
FIG. 6 shows a cross-sectional side elevation view of the housing cover of FIG. 5 as viewed along lines 6—6 of the latter figure.

A pair of flexible steel spring coils 16, 18 are disposed within the housing 12 upon which rests a pair of flat generally rectangular article supporting plates 20, 22. Each of the plates 20, 22 contain a pair of rectangular slots 24 opening toward opposing broad, inside walls of the housing 12. A series of raised, elongated ribs 26 formed on the opposing, broad inside walls of the housing 12 project into the slots 24 and form rails or guideways along which the plates 20, 22 may be raised and lowered In the present example of my invention, FIG. 1 shows a stack of plastic bowl lids 28 supported by the plate 20 while a stack of plastic bowls 30 is supported by the plate 22. The lids 28 extend through a circular opening 32 in the top of the cover 14 and are confined against a lid cover 34. Three projections or nibs 36 extend downward from a ceiling 38 (see FIG. 5) of the cover 14 around the opening 32 to guide the stack of lids 28 therethrough. In the lid dispenser portion of the assembly 10, the vertical surfaces of the nibs 36 which face the opening 32 are slightly curved to conform to the opening 32 above so that the nibs 36 guide, rather than restrict, passage of the lids 28 as they pass upwardly toward the opening 32. The lid cover 34 overlies slightly more than fifty percent of the surface area of the lids 28 so that the top lid in the stock can readily be pulled from the stack through an opening 39. The lid cover 34 is thus a generally semi-cylindrical cap resting on a triangular-shaped base or flange 40. The flange 40 contains slots 42 on opposite sides of the opening 38 for securing the cover 34 to the top of the cover 14 over the opening 32 by means of suitable fasteners 44.

The bowl dispenser portion of the assembly 10 varies from the lid dispenser portion in the following particulars. A series of three nibs 46 project downwardly from the ceiling 38 of the cover 14 around an opening 48. The nibs 46, unlike the nibs 36 surrounding the opening 32, are of generally elliptical cross-section and project inwardly of the perimeter of the opening 48 so as to interfere with and overlie the bottom of the rolled rims of the bowls 30. Since the rolled rims of the bowls 30 are formed of flexible paper, cardboard or plastic, the top one of the bowls 30 can readily be lifted clear of the nibs 46 and the opening 48 by hand.

Figure 2:
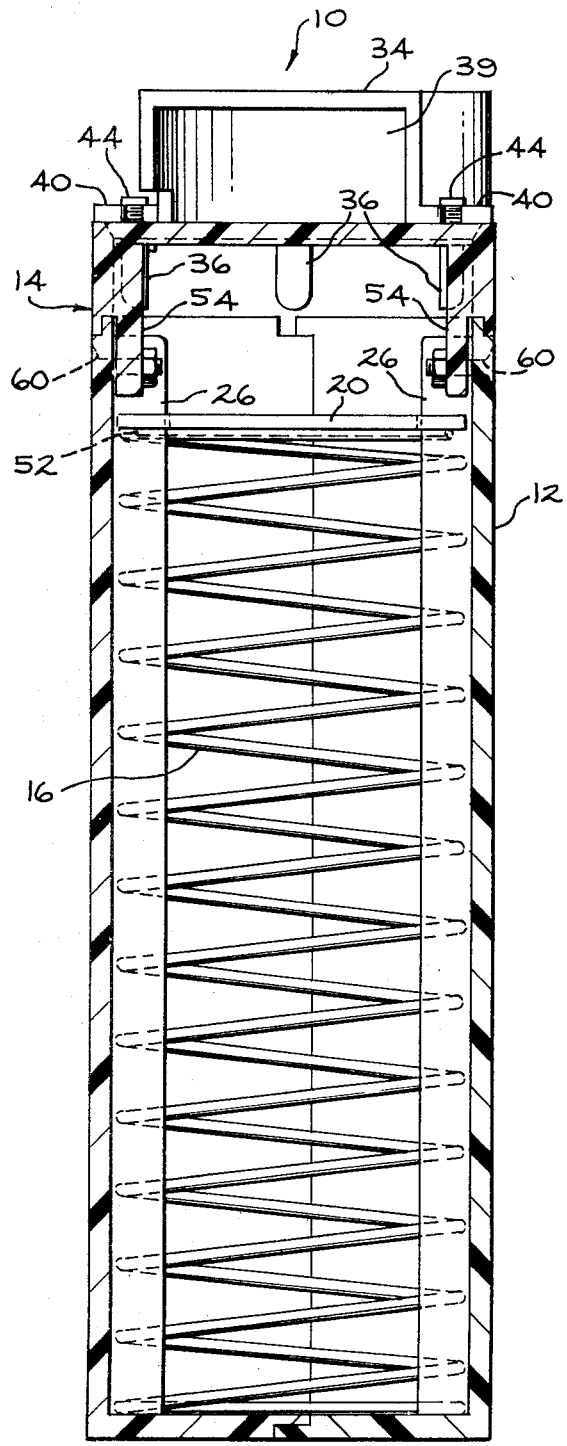
FIG. 2 shows a cross-sectional side elevation view of the dispensing assembly of FIG. 1 as viewed along cross-sectional lines 2—2 of the latter figure and showing the lid dispensing portion of said assembly.
Figure 3:
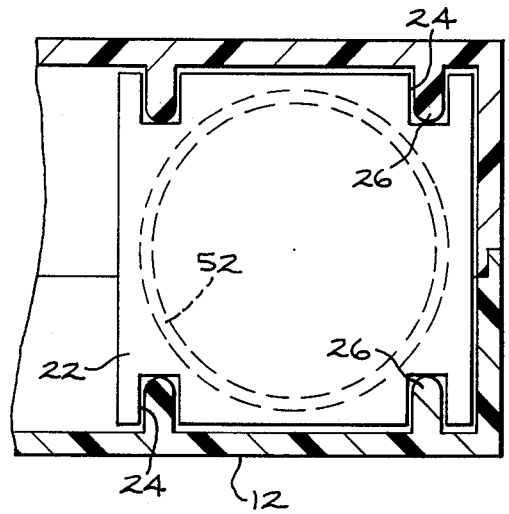
FIG. 3 shows a fragmented cross-sectional plan view of the assembly of FIG. 1 as viewed along cross-sectional lines 3—3 of the latter figure.
Figure 4:
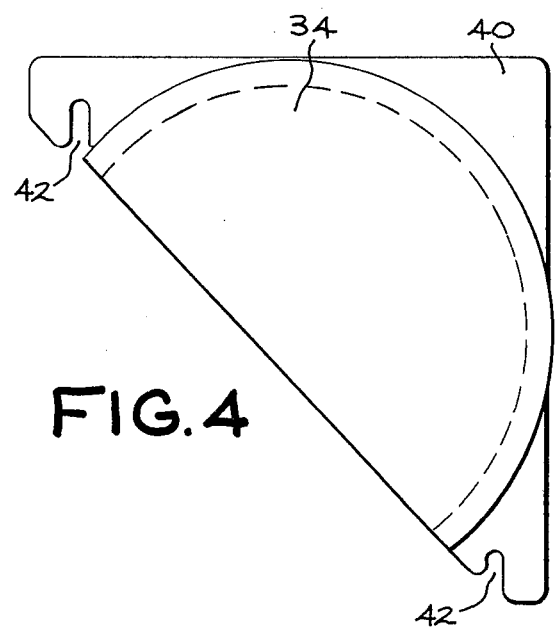
FIG. 4 shows a top plan view of a lid cover as used in the assembly of FIG. 1.

The housing 12, cover 14 and lid cover 34 as well as the plates 20, 22 and ribs 26 may be constructed of any suitably rigid and durable material such as, for example, molded plastic, fiberglass or stainless steel. The cover 14 defines a ledge 50 around its inside vertical walls which seats securely along and around the top of the walls of the housing 12 (See FIG. 5). The bottom surface of the plates 20, 22 define a slightly raised circular wall 52 (See FIGS. 2-3) which provides a form around which the top of the coils 16, 18 fit. A pair of elongated members 54 project downward from the ceiling 38 to form guides for placing the cover 14 on the housing 12. Holes 56 through lower end portions of the members 54 register with holes 58 in opposite walls of the housing 12 so that the cover 14 and housing 12 can be secured together with suitable fasteners 60 (See FIG. 2).

Although the subject invention has been described with respect to specific details of a certain preferred embodiment thereof, it is not intended that such details limit the scope of the subject invention otherwise than as set forth in the following claims.

I claim:

1. A bowl dispenser assembly comprising
a housing open at one end,
a spring coil disposed in said housing,
an article supporting plate resting on said coil,
a plurality of raised, elongated ribs formed on and extending along inside walls of said housing, said plate defining slots opening toward said walls, said ribs projecting into said slots to form rails along which said plate can be raised and lowered,
a housing cover disposed over the open end of said housing and defining a circular opening through which a stack of bowls supported by said plate may extend, and
at least three nibs of generally elliptical cross-section stationarily attached to and projecting downwardly from a ceiling of said housing cover around and below said opening and projecting inwardly of the periphery of said opening sufficiently to interfere with a top rim of a top one of said bowls to confine said bowls and maintain said coil in compression against said plate.

2. The dispenser of claim 1 wherein said housing is rectangular in cross-section.

3. The dispenser of claim 2 wherein said plate is rectangular in shape.

4. The dispenser of claim 2 wherein said plate contains a raised, circular wall on one broad surface thereof providing a form around which the upper end of said coil is disposed.

5. The dispenser of claim 3 wherein said plate defines a first pair of said slots opening toward a first inside wall of said housing and a second pair of said slots opening toward a second inside wall of said housing opposed to said first inside wall, each of said inside walls containing a pair of said ribs.

6. A bowl and lid dispenser comprising
a rectangular-shaped housing, open at an upper end thereof,
a pair of spring coils disposed beside one another in said housing,
a pair of flat, rectangular article supporting plates resting on the upper end of each of said coils and defining a raised circular wall on the bottom surfaces of each said plate around which the upper end of each said coil extends, each of said plates containing two pairs of slots, a first of said pairs of slots opening toward one broad inside wall of said housing and a second pair of said slots opening toward the other broad inside wall of said housing opposite said one inside wall,
a series of raised, elongated ribs extending vertically along each of said inside walls and projecting into each of said slots to form a series of rails along which said plates may be raised and lowered independently of one another,
a housing cover disposed over the upper end of said housing and defining a pair of circular openings through a ceiling thereof through which stacks of bowls and bowl lids supported on said plates may extend,
means for securely fastening said housing cover to said housing with fasteners,
a first series of three elongated nibs projecting downwardly from said ceiling toward the upper end of said housing and disposed around a first one of said openings in said housing cover, each of said first series containing a curved surface facing inwardly toward said first opening and conforming to the periphery of said first opening to provide a guide for a stack of lids supported by a plate under said first opening to extend vertically through said first opening without interference,
a lid cover forming a generally semi-cylindrical housing attached to said housing cover and defining an opening in the side thereof through which the top one of said lids in said lid stack may be removed by hand, and
a second series of three elongated nibs projecting downwardly from said ceiling toward the upper end of said housing and disposed around a second one of said openings in said housing cover, each of said second series being of generally elliptical cross-section and extending inwardly of said second opening for interfering with the rim of said bowls to compress them against the article supporting plate and coil below said second opening.

7. A lid dispenser comprising
a housing open at one end,
a spring coil disposed in said housing,
an article supporting plate resting on said coil,
a plurality of raised, elongated ribs formed on and extending along inside walls of said housing, said plate defining slots opening toward said walls, said ribs projecting into said slots to form rails along which said plate can be raised and lowered,
a housing cover disposed over the open end of said housing and defining a circular opening through which a stack of lids supported by said plate may extend,
at least three projections extending downwardly from said housing cover and disposed equidistant from one another around said opening, said projections having a surface facing toward the centerline of said opening which are curved to conform to the periphery of said opening to form a guide for the movement of said lids through said opening, and a lid cover attached to said housing cover having a generally semi-circular cap spaced above said opening to confine said lids against said plate and spring and having an open side through which the top one of said lids may be drawn by hand out of said cap.

8. The lid dispenser of claim 7 wherein said lid cover comprises a triangular shaped base attached to said housing cover, said cap being attached to said base.

* * * * *